United States Patent
Kotik et al.

(10) Patent No.: US 7,316,358 B2
(45) Date of Patent: Jan. 8, 2008

(54) IDENTIFICATION BAND WITH ADHESIVELY ATTACHED COUPLING ELEMENTS

(75) Inventors: Mark M. Kotik, Santa Monica, CA (US); Walter W. Mosher, Jr., West Hills, CA (US)

(73) Assignee: Precision Dynamics Corporation, San Fernando, CA (US)

( * ) Notice: Subject to any disclaimer, the term of this patent is extended or adjusted under 35 U.S.C. 154(b) by 107 days.

(21) Appl. No.: 10/712,935

(22) Filed: Nov. 12, 2003

(65) Prior Publication Data

US 2004/0104274 A1 Jun. 3, 2004

Related U.S. Application Data

(63) Continuation-in-part of application No. 10/101,219, filed on Mar. 18, 2002.

(51) Int. Cl.
*G06K 19/06* (2006.01)
(52) U.S. Cl. .................. 235/492; 235/486
(58) Field of Classification Search ............ 235/492, 235/486, 375, 479, 487; 340/572.3, 572.5; 224/164–180
See application file for complete search history.

(56) References Cited

U.S. PATENT DOCUMENTS

| | | | |
|---|---|---|---|
| 1,407,239 A | | 2/1922 | Weiss |
| 4,328,978 A | | 5/1982 | McLaughlin |
| 4,835,372 A | * | 5/1989 | Gombrich et al. ........... 235/375 |
| 4,862,436 A | * | 8/1989 | Harilela ........................ 368/282 |
| 4,910,499 A | | 3/1990 | Benge et al. |
| 4,993,068 A | * | 2/1991 | Piosenka et al. ............. 713/186 |
| 5,128,686 A | * | 7/1992 | Tan et al. ..................... 343/718 |
| 5,206,897 A | * | 4/1993 | Goudreau et al. ............. 379/38 |
| 5,411,294 A | | 5/1995 | Diemert |
| 5,450,091 A | * | 9/1995 | Hama ........................... 343/718 |
| 5,457,906 A | * | 10/1995 | Mosher, Jr. ................... 40/633 |
| 5,479,797 A | | 1/1996 | Peterson |
| 5,493,805 A | | 2/1996 | Penuelaet et al. |
| 5,581,924 A | | 12/1996 | Peterson |
| 5,609,716 A | * | 3/1997 | Mosher, Jr. ................... 156/522 |
| 5,742,233 A | * | 4/1998 | Hoffman et al. ........... 340/573.1 |
| 5,799,426 A | | 9/1998 | Peterson |
| 5,833,273 A | | 11/1998 | Strenk et al. |
| 5,852,590 A | * | 12/1998 | de la Huerga ................. 368/10 |
| 5,875,719 A | | 3/1999 | Francis |
| 5,877,675 A | * | 3/1999 | Rebstock et al. .......... 340/286.07 |
| 5,883,576 A | * | 3/1999 | De La Huerga .......... 340/573.1 |
| 5,905,461 A | * | 5/1999 | Neher ...................... 342/357.07 |
| 5,920,053 A | * | 7/1999 | DeBrouse ..................... 235/375 |
| 5,960,085 A | * | 9/1999 | de la Huerga .............. 340/5.61 |

(Continued)

*Primary Examiner*—Daniel St. Cyr
(74) *Attorney, Agent, or Firm*—Kelly Lowry & Kelley LLP (57) ABSTRACT

An improved identification band such as a wristband or the like is provided of the type including a radio frequency identification (RFID) circuit for communicating wearer information with a remote reader. A pair of electronic coupling elements such as capacitor plates are formed at opposite head and tail ends of the identification band, and are adapted for adhesive securement in mutually coupled relation to enable the RFID circuit with a predetermined circuit resonance frequency fortuned communication with the remote reader. Upon attempted separation of the band head and tails ends, for removal of the identification band from the wearer, one or both of the coupling elements is physically distorted to alter the circuit resonance frequency, thereby detuning the circuit and preventing subsequent communication with the remote reader.

71 Claims, 8 Drawing Sheets

U.S. PATENT DOCUMENTS

| | | | |
|---|---|---|---|
| 5,973,598 A * | 10/1999 | Beigel | 340/572.1 |
| 5,973,600 A * | 10/1999 | Mosher, Jr. | 340/572.8 |
| 5,978,493 A * | 11/1999 | Kravitz et al. | 382/115 |
| 6,058,637 A | 5/2000 | Duncan | |
| 6,139,495 A * | 10/2000 | De La Huerga | 600/300 |
| 6,181,287 B1 | 1/2001 | Beigel | |
| 6,255,951 B1 * | 7/2001 | De La Huerga | 340/573.1 |
| 6,259,654 B1 * | 7/2001 | de la Huerga | 368/10 |
| 6,280,544 B1 | 8/2001 | Fox et al. | |
| 6,346,886 B1 * | 2/2002 | De La Huerga | 340/573.1 |
| 6,388,612 B1 * | 5/2002 | Neher | 342/357.07 |
| 6,414,543 B1 | 7/2002 | Beigel et al. | |
| 6,613,179 B1 | 9/2003 | McCoy et al. | |
| 2002/0084904 A1 * | 7/2002 | De La Huerga | 340/573.1 |

* cited by examiner

IDENTIFICATION BAND WITH ADHESIVELY ATTACHED COUPLING ELEMENTS

RELATED APPLICATION

This is a continuation-in-part of copending U.S. patent application Ser. No. 10/101,219, filed Mar. 18, 2002.

BACKGROUND OF THE INVENTION

This invention relates generally to improvements in identification band appliances such as wristbands and the like, and to related fabrication methods, wherein the identification band is designed for mounting onto an authorized wearer and includes a tuned communication circuit for communicating information with a remote reader. More particularly, this invention relates to an improved identification band wherein the communication circuit is enabled upon interconnection of opposite band ends to shape the band into a closed loop configuration concurrently with mounting onto an authorized wearer, but further wherein the communication circuit is effectively disabled or detuned upon attempted removal of the band from the wearer to provide evidence of tampering and/or to provide enhanced security by preventing band re-use.

Identification bands such as a wristbands or bracelets or other closed loop elements are generally known in the art, wherein the identification band bears or carries some form of information associated with the person wearing the band, or associated with the object to which the band is mounted or attached. In a typical construction, e.g., for use as a wristband, an elongated flexible strap formed from plastic or the like is wrapped about the wrist of an authorized wearer, and includes interfitting or interengageable securement members at opposite ends thereof for suitable interconnection to retain the identification band on the wearer's wrist. Such identification bands have been widely used, e.g., for patient identification in a medical facility or the like, for personnel identification and/or access control at secured facilities such as military or industrial installations and at prisons and the like, for patron identification at amusement parks and events such as concerts and the like.

In recent years, identification bands have been designed to incorporate a radio frequency identification (RFID) circuit adapted to store selected information, and for wireless transmission of the stored information to a remote reader which may include power transmission means for energizing the RFID circuit. The information stored by the RFID circuit may encompass a wide range of detailed biometric or other identification information or the like associated with the specific person wearing the identification band. For illustrative examples of identification bands and the like including RFID technology, see U.S. Pat. Nos. 5,479,797; 5,493,805; 5,457,906; 5,581,924; 5,973,598; 5,973,600; 6,181,287; and 6,414,543.

Copending U.S. Ser. No. 10/101,219, which is incorporated by reference herein, discloses a variety of improved identification band embodiments including an RFID circuit adapted for activation when the band is mounted onto an authorized wearer or specified object. Such improved embodiments incorporate securement means for securely interconnecting opposite ends of the identification band in a manner retaining the band in a closed loop geometry of selected size wrapped about the wearer's wrist or the like. These improved identification bands generally include circuit elements carried at opposite ends of the band in combination with a conductive connector for establishing electrical contact between these circuit elements as the band opposite ends are interconnected, thereby enabling the RFID circuit as the band is mounted onto the wearer.

While identification bands incorporating RFID technology represent a significant step forward in the art, significant problems remain with respect to preventing unauthorized tampering and/or transfer of an identification band from an authorized to an unauthorized wearer. That is, it is highly desirable to prevent re-use of an identification band having an activated or enabled communication circuit by an unauthorized person for whom the stored identification information does not correspond. Toward this end, in the past, identification bands have been developed with pre-cut slits formed in the resilient band material so that attempted forced removal of the band from an authorization wearer will be accompanied by an externally visible stretching and/or deformation of the band material as an indication of attempted tampering. Alternative concepts have used multi-layered colored film adapted to delaminate upon attempted forced removal thereby displaying a different external color as an indication of attempted tampering. Such designs, however, rely upon regular and diligent inspection of the identification band to preclude re-use by an unauthorized wearer.

There exists, therefore, a need for further improvements in and to identification bands of the type including an RFID circuit, particularly with respect to providing substantially fail-safe protection against unauthorized re-use, without requiring direct visual inspection of the band. The present invention fulfills these needs and provides further related advantages.

SUMMARY OF THE INVENTION

In accordance with the invention, an improved identification band such as a wristband or the like is provided of the type including a radio frequency identification (RFID) or communication circuit for communicating wearer information with a remote reader. The identification band incorporates a pair of electronic coupling elements formed generally at opposite ends of an elongated flexible strap, and adapted for adhesive securement in mutually coupled relation to enable the RFID circuit with a predetermined circuit resonance frequency fortuned communication with the remote reader. Upon attempted separation of the band opposite ends, sufficient for removal of the identification band from the wearer, one or both of the coupling elements is physically distorted or deformed to alter the circuit resonance frequency, thereby detuning the circuit and preventing subsequent communication with the remote reader.

In one preferred form, the improved identification band comprises the flexible strap formed from plastic or the like with a selected length, and defining the opposite head and tail ends. The electronic coupling elements, such as a pair of capacitor plates or a pair of inductor coils, are respectively formed generally at said head and tail ends for overlapping or overlying juxtaposition as the band is wrapped or looped about a portion of an authorized wearer or specified object, such as a person's wrist or the like. This pair of coupling elements is preferably formed as by high speed printing on a common side of the flexible strap, so that the coupling elements are physically separated by the thickness of the strap which is formed from a dielectric material. The overlapping head and tail ends of the band are securely interconnected by means of a relatively strong adhesive, such as a selected pressure sensitive adhesive, for securely retaining the band on the authorized wearer, and also for securely retaining the pair of coupling elements in mutually coupled relation. When mutually coupled in this manner, the coupling elements effectively enable or activate the RFID circuit to permit wireless information transfer at a tuned or predetermined circuit resonance frequency relative to the remote reader.

Upon attempted removal of the identification band from the authorized wearer, particularly such as attempted forced separation of the adhesively interconnected head and tail ends sufficient to permit band removal from the authorized wearer and re-mounting onto an unauthorized wearer, the strength of the adhesive interface results in mechanical distortion or deformation of one or both coupling elements sufficient to alter the circuit resonance frequency upon attempted re-use. As a result, in one preferred form of the invention, the RFID circuit is detuned to a different resonance frequency which is not recognized by and thus precludes subsequent communication with the remote reader. Alternately, in another preferred form, the RFID circuit includes means for recognizing that a change in circuit resonant frequency has taken place, thereby indicating that attempted tampering has occurred, and for transmitting that fact to the remote reader upon subsequent communication therewith.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 3 is a perspective view depicting the elongated flexible strap of FIG. 2 having a pair of capacitor plates and an antenna formed thereon as by printing or the like;

FIG. 4 is a perspective view showing the partially formed identification band of FIG. 3 with a pair of nonconductive barrier strips formed thereon as by printing or the like;

FIG. 5 is a perspective view of the partially formed identification band of FIG. 4, and illustrating additional conductors formed thereon as by printing or the like;

FIG. 6 is a perspective view of the partially formed identification band of FIG. 5, and further depicting mounting thereon of an electronic component such as a solid state chip or the like;

FIG. 15 is a perspective view showing the partially formed identification band of FIG. 14 with a pair of nonconductive barrier strips or layers formed thereon as by printing or the like;

FIG. 16 is a perspective view showing the partially formed identification band of FIG. 15, and illustrating additional conductors formed thereon as by printing or the like;

FIG. 17 is a perspective view of the partially formed identification band of FIG. 16, and further depicting mounting thereon of an electronic component such as a solid state chip or the like;

FIG. 19 is a perspective view showing the partially formed identification band of FIG. 18 with nonconductive barrier strips or layers of dielectric material formed thereon as by printing or the like;

FIG. 20 is a perspective view showing the partially formed identification band of FIG. 19, and illustrating additional conductor components formed thereon as by printing or the like; and FIG. 21 is a perspective view of the partially formed identification band of FIG. 20, and further depicting mounting thereon of an electronic component such as a solid state chip or the like.

DETAILED DESCRIPTION OF THE PREFERRED EMBODIMENTS

Figure 1:
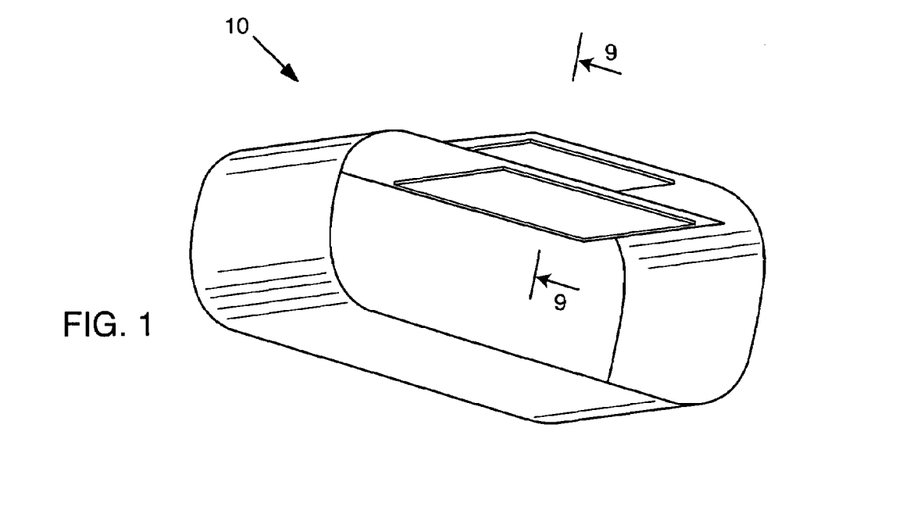
FIG. 1 is a perspective view illustrating an identification band incorporating adhesively attached coupling elements in the form of capacitor including a pair of capacitor plates formed at opposite head and tail ends of the band.

As shown in the exemplary drawings, an improved identification band referred to generally in FIG. 1 by the reference numeral 10 is provided for mounting onto a person or specified object, such as by mounting about the wrist of an authorized wearer. The identification band 10 incorporates a radio frequency identification (RFID) or communication circuit 12 (shown best in FIGS. 6-7) for communicating wearer-associated information with a remote reader (not shown). The band 10 further includes electronic coupling elements such as a pair of capacitor plates 14 and 16 (FIGS. 2-7 and 9-10) formed at the opposite head and tail ends thereof for adhesive securement in overlying or overlapping, mutually coupled relation to enable the RFID circuit upon mounting the band 10 onto the authorized wearer. Upon attempted forced removal of the band 10 from an authorized wearer, these electronic coupling elements 14 and 16 are designed for physical distortion or deformation sufficient to disable or detune the RFID circuit, thereby providing evidence of tampering and/or precluding subsequent communication with the remote reader.

The improved identification band 10 of the present invention generally comprises an elongated substrate strap 18 (FIG. 2) formed from a suitable lightweight and flexible material such as a selected plastic which is preferably resistant to significant longitudinal stretching. In general terms, the substrate strap 18 provides a base structure for receiving and supporting electronic components which collectively comprise the RFID circuit 12. As is known in the art, the RFID circuit 12 is adapted to receive and store identification information associated with the authorized wearer of the identification band 10, and for wireless information transmission relative to the remote reader which may additionally include power transmission means for energizing the RFID circuit. Moreover, many of the components forming the RFID circuit 12 may be applied to or formed on the strap 18 by relatively high speed, thin film printing processes. Exemplary RFID circuits incorporated into identification bands and the like are shown and described in more detail in U.S. Pat. Nos. 5,479,797; 5,493,805; 5,457,906; 5,581,924; 5,973,598; 5,973,600; 6,181,287; and 6,414,543, and in copending U.S. Ser. No. 10/101,219, all of which are incorporated by reference herein.

Figure 2:
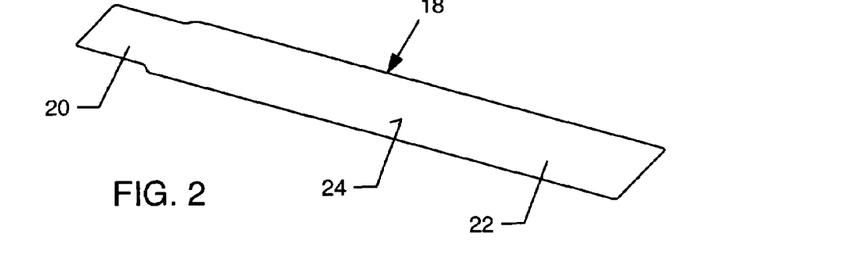
FIG. 2 is a perspective view of an elongated flexible strap forming a base substrate for the identification band shown in FIG. 1.

FIGS. 2-7 depict a sequence of fabrication process steps for producing the improved identification band 10 of the present invention, in accordance with one preferred embodiment thereof. More particularly, FIG. 2 illustrates a blank substrate strap 18 having an overall length and width suitable for its ultimate intended use, such as a wristband sized for mounting about the wearer's wrist. The opposite ends of the strap 18 define a head end 20 and a tail end 22, with an intermediate central strap region 24. As shown, the head end 20 may be trimmed to a slightly narrower width, relative to the adjoining central region 24, for facilitating proper mounting of the assembled band 10 onto an authorized wearer, as will be described herein in more detail.

Figure 3:
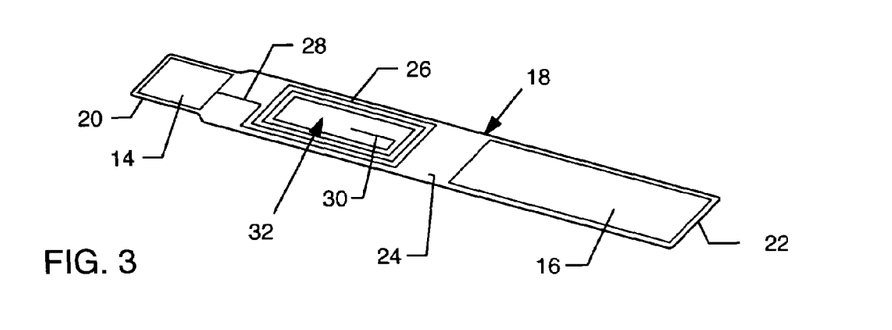

The electronic coupling elements 14 and 16 comprise, in the illustrative preferred embodiment, a pair of capacitor plates formed respectively on or at the head 20 and tail 22 of the substrate strap 18 (FIG. 3). As previously noted, these capacitor plates 14 and 16 may be formed by thin film printing using a suitable conductive ink. The capacitor plates 14 and 16 are applied to a common side of the substrate strap 18. The overall size and area of the capacitor plate 14 formed on the strap head 20 is closely predetermined, preferably in physical relation to the size of the head 20. The other capacitor plate 16, formed on the tail 22, has a width at least equal to the width of the capacitor plate 14. However, in the preferred form, the capacitor plate 16 at the tail 22 has a length that is substantially greater than the length of the capacitor plate 14 at the head 20.

FIG. 3 additionally depicts an antenna coil 26 formed as by thin film printing on the central region 24 of the substrate strap 18, at a position generally between the two capacitor plates 14 and 16. This coil 26 may be formed concurrently with the capacitor plates 14 and 16 as part of a common printing step with conductive ink, wherein the coil 26 is also applied to the same side of the substrate strap 18. An outer end of the coil 26 includes a conductor trace 28 coupled to the capacitor plate 14, whereas the inner coil end includes a second conductor trace 30 extending a short distance into an internal zone 32 surrounded by the coil 26.

Figure 4:
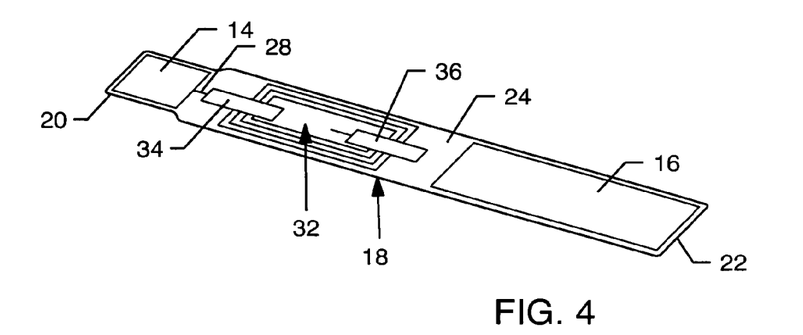

FIG. 4 illustrates a subsequent fabrication process step wherein a pair of nonconductive bridge layers 34 and 36 are applied to the substrate strap 18 to extend or bridge over the opposite ends of the coil 26. These bridge layers 34 and 36 may be formed by high speed thin film printing using a suitable nonconductive ink.

Figure 5:
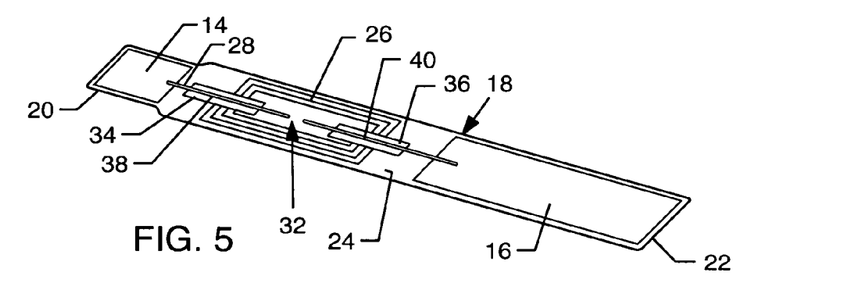

In a succeeding process step, as viewed in FIG. 5, additional conductive traces 38 and 40 are applied to extend over the bridge layers 34 and 36, respectively. These additional conductive traces 38 and 40 are also conveniently applied by thin film printing. As shown, the conductive trace 38 extends over the bridge layer 34 from the trace 28 coupled to the capacitor plate 14 at the head 20, to an inboard end within the internal zone 32 in spaced relation with the trace 30. The other conductive trace 40 extends over the other bridge layer 36 from the trace 30 within the internal zone 32 to the capacitor plate 16 at the tail 22.

Figure 6:
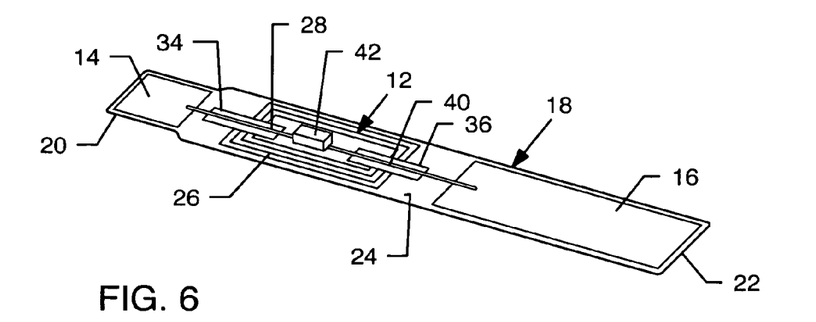

An RFID chip 42 such as a solid state chip is then mounted onto the substrate strap 18 within the internal zone 32 circumscribed by the coil 26, and in conductive relation with the inboard ends of the traces 38 and 40, as viewed in FIG. 6. This RFID chip 42 may incorporate a suitable adhesive on an underside surface thereof, such as an anisotropic conductive film for suitable press-on mounting by use of automated process equipment (not shown). Alternatively, persons skilled in the art will recognize and appreciate that the RFID chip 42 may be substituted by direct printing of the logic circuitry onto the substrate strap 18, in conductive relation with the inboard ends of the conductive traces 38 and 40.

Figure 7:
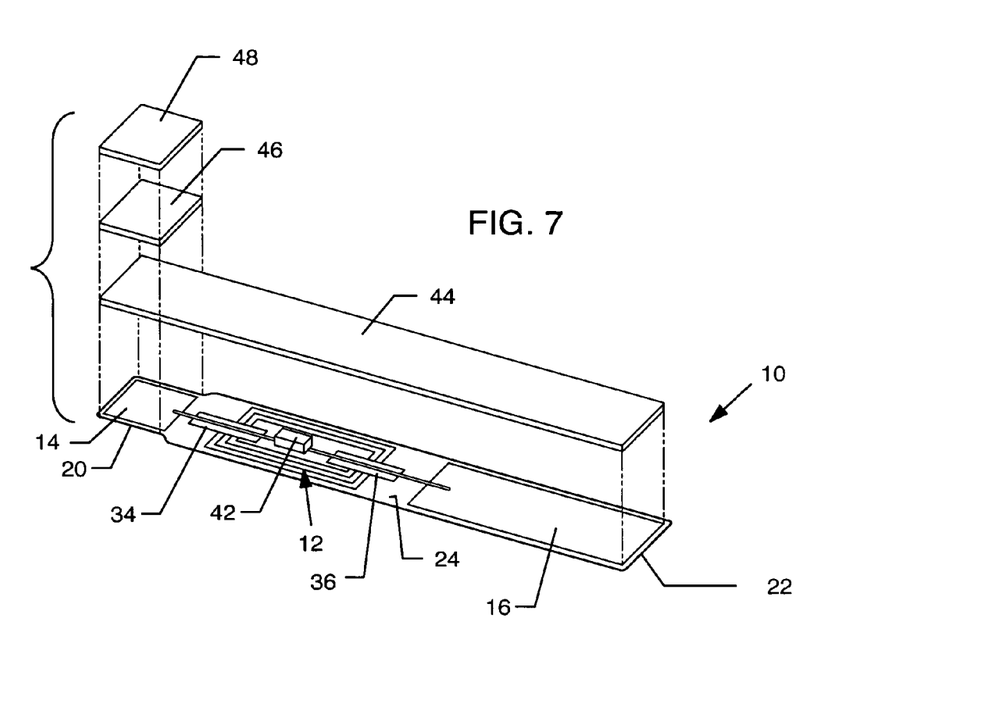
FIG. 7 is a further perspective view showing the band of FIG. 6, and further illustrating mounting thereon of an overlying protective film, and mounting of a pressure sensitive adhesive patch with a peel-off strip.

Thereafter, if desired, an overlying protective film 44 of a suitable dielectric material is applied over the upwardly presented surface of the substrate strap 18, to encase and protect the components of the RFID circuit 12 thereon. In addition, a layer of a suitable adhesive such as a pressure sensitive adhesive 46 is applied over the head end 20, together with an associated peel-off paper strip 48 or the like. This adhesive 46 may be applied over the protective film 44, or in the event that the protective film 44 terminates at a base end of the head 20, the adhesive 46 may be applied directly over the underlying capacitor plate 14. In either case, the peel-off paper strip 48 incorporates a conventional release film or liner (not shown) so that it can be easily peeled away from the underlying adhesive 46 without sticking.

Figure 8:
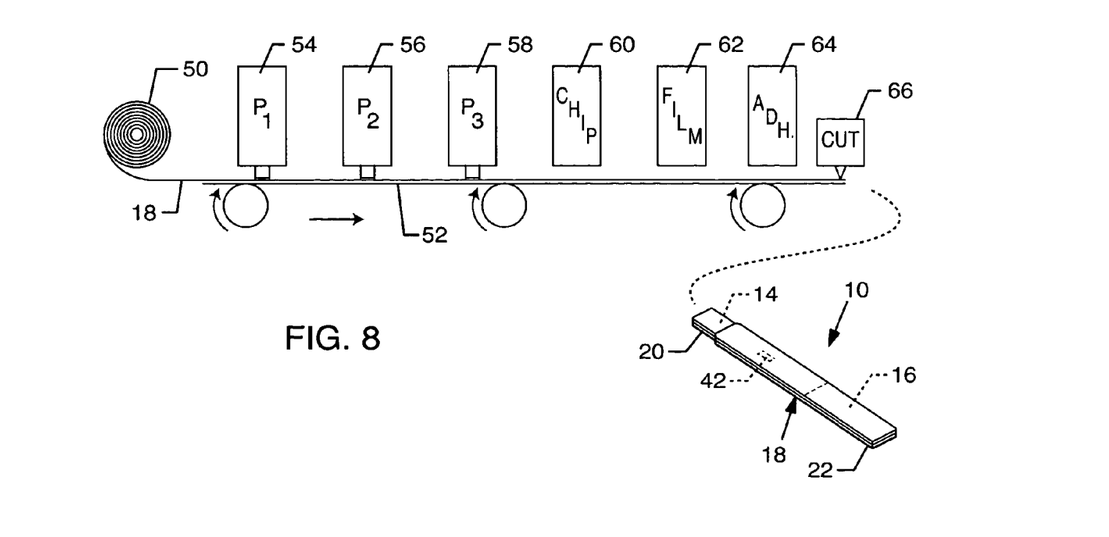
FIG. 8 is a schematic diagram illustrating a sequence of process steps for construction of the identification band of the present invention.

FIG. 8 schematically depicts the above-described sequence of fabrication process steps, to include a roll 50 of substrate strap material 18. The elongated strap material is withdrawn from the roll 50 and conveyed by suitable conveyor means 52 in sequence through a succession of process stations for producing the individual identification bands 10 of the present invention. As shown, a first print station 54 applies the pair of capacitor plates 14, 16 and the antenna coil 26 by thin film printing with a conductive ink. A second print station 56 then applies the nonconductive bridge layers 34, 36 by thin film printing with a nonconductive ink. A third print station 58 applies the additional conductive traces 38, 40 by thin film printing with a conductive ink. A chip installation station 60 then mounts the RFID chip 42 in the appropriate location, or alternatively prints the RFID logic circuitry onto the strap material 18, and a film mount station 62 applies the optional overlying protective dielectric film 44. An adhesive applicator station 64 applies the pressure sensitive adhesive layer 46 and associated peel-off strip 48, followed by a cutting station 66 which trims each of the thus-constructed identification bands 10 from the roll material 18. In accordance with one aspect of the invention, all of these processing steps as viewed in FIG. 8 are performed at a common upper side of the strap material 18.

Figure 9:
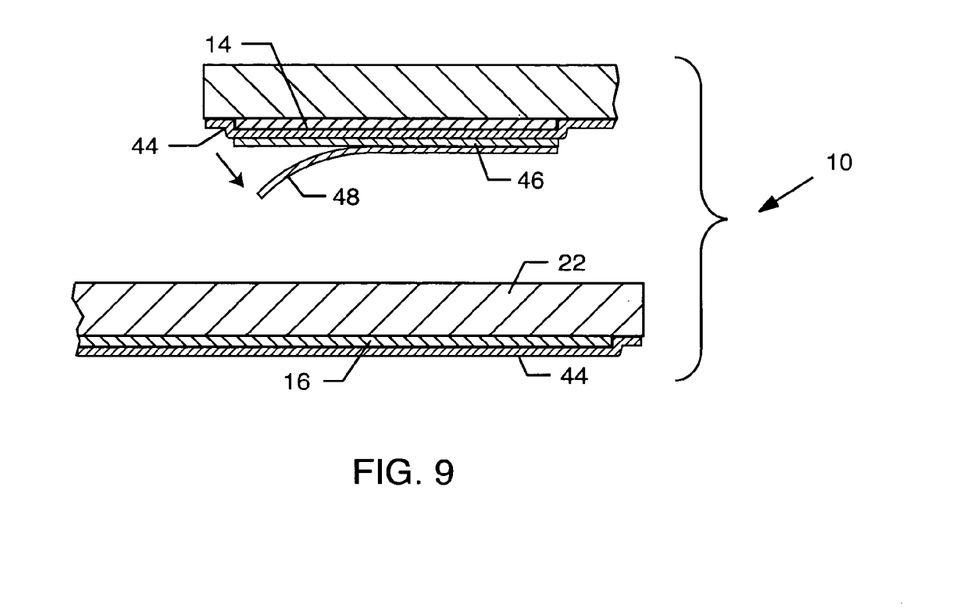
FIG. 9 is an enlarged and fragmented exploded vertical sectional view taken generally on the line 9-9 of FIG. 1, and depicting opposite head and tail ends of the band in generally overlying relation for adhesive attachment.
Figure 10:
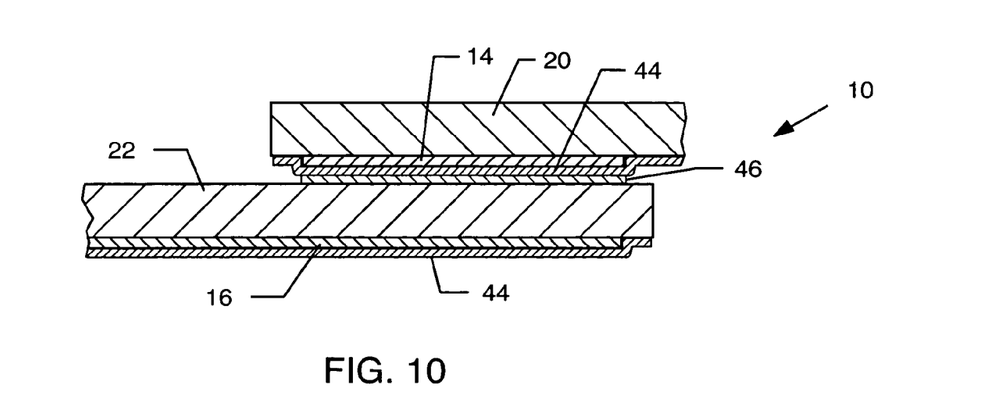
FIG. 10 is an enlarged vertical sectional view similar to FIG. 9, and illustrating the opposite head and tail ends of the band in adhesively attached relation, with the pair of coupling elements in mutually coupled relation.

FIGS. 9 and 10 illustrate adhesive interconnection of the head and tails ends 20 and 22 of the band 10 for mounting the identification band onto an authorized wearer or specified object, such as mounting onto the wearer's wrist. In this regard, the band 10 is wrapped about the wearer's wrist or the like with the head end 20 disposed in outboard overlying relation to the tail end 22, with the side bearing the pressure sensitive adhesive 46 facing inwardly toward the tail end 22. The peel-off paper strip 48 with release film is separated from the adhesive layer or patch 46, and the thus-exposed adhesive layer 46 is pressed firmly against the underlying outboard side of the strap tail end 22. Importantly, the head and tail ends 20, 22 are pressed together for secure adhesive interconnection, in a suitable overlapping relation so that the circumferential size of the now closed loop-shaped band 10 will fit comfortably on the wearer but with sufficient snugness to prevent easy slide-off removal from the wearer.

Such adhesive securement of the strap head and tail ends 20, 22 effectively positions the capacitor plates 14, 16 in overlying and mutually coupled relation to form a capacitor component of the RFID circuit 12. That is, the capacitor plate 14 on the head end 20 is firmly secured in overlying relation with the capacitor plate 16 on the tail end 22, and in spaced-apart relation with the strap tail end 22 and the combined layers formed by the adhesive 46 and the protective film 44 disposed therebetween. Since these intervening layers are formed from suitable dielectric materials, such layers cooperatively define the dielectric for the thus-assembled capacitor.

In accordance with a further important aspect of the invention, the thus-assembled capacitor defined by the spaced-apart capacitor plates 14, 16 provides a predetermined capacitance and thus additionally results in a predetermined resonance frequency for tuned communication between the RFID circuit 12 and the remote reader. More particularly, as noted above, the capacitor plate 14 on the head 20 is formed with a carefully predetermined area. By positioning the other, longer capacitor plate 16 so that it spans the entire length of the shorter capacitor plate 14, i.e., so that the outboard edge of the larger capacitor plate 16 is drawn at least slightly past the base end of the head 20, the resultant circuit capacitance is predetermined by the area of the capacitor plate 14. In other words, the head and tail ends 20, 22 of the strap are adhesively interconnected with the smaller capacitor plate 14 positioned longitudinally between the opposite ends of the longer capacitor plate 16, to provide the predetermined capacitance and predetermined resonance frequency for the RFID circuit 12. The longer capacitor plate 16 conveniently defines a range of circumferential size adjustment for fitting the identification band 10 onto the wrist or the like of persons of different size.

In use, the assembled head and tail ends 20, 22 thus support and retain the capacitor plates 14, 16 in mutually coupled relation to enable or activate the RFID circuit 12. In this enabled state, the RFID circuit is designed for wireless communication with the remote reader at the tuned resonance frequency as predetermined by the mutually coupled capacitor plates. Such wireless communication may be used to check and verify identity and/or other information associated with the wearer, for a variety of security and access control or other information purposes.

However, in accordance with one aspect of the invention, the adhesive interface provided by the adhesive 46 has a bond strength relative to the structural integrity of the band material 18 sufficient to mechanically distort and/or deform one of both of the thin film capacitor plates 14, 16 upon attempted forced separation, thereby altering the circuit capacitance upon attempted re-assembly and re-use of the identification band. In one preferred form, the adhesive 46 comprises a pressure sensitive adhesive having a bond strength of at least about 2 PLI (pounds per linear inch). With this construction, the application of elongation forces and/or separation forces to the identification band 10, sufficient to remove the band from the authorized wearer, will cause the head and/or tail ends 20, 22 thereof to mechanically stretch, distort and deform sufficiently deform and/or delaminate or tear one or both of the capacitor plates 14, 16.

Such structural alteration to either capacitor plate 14, 16 will result in alteration in circuit capacitance and a corresponding alteration in the resonance frequency for tuned communication with the remote reader, upon attempted re-use of the band 10. Accordingly, by detuning the RFID circuit 12 from the predetermined frequency recognized by the reader, to a different frequency not recognized by the reader, subsequent communication with the remote reader will not be possible. Such communication failure will thus prevent re-use of the band 10 by an unauthorized wearer, and will further provide an indication that the band 10 may be have been the subject of attempted tampering.

Figure 11:
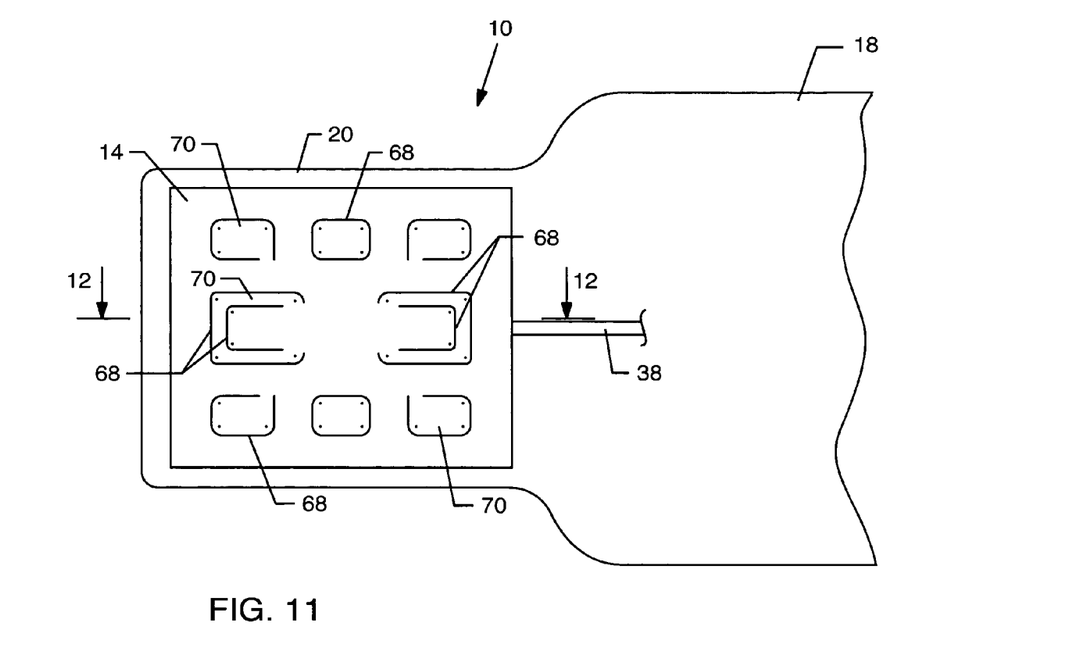
FIG. 11 is an enlarged fragmented plan view of a head end of the identification band, incorporating pre-formed cuts or slits therein in accordance with one preferred form of the invention.
Figure 12:
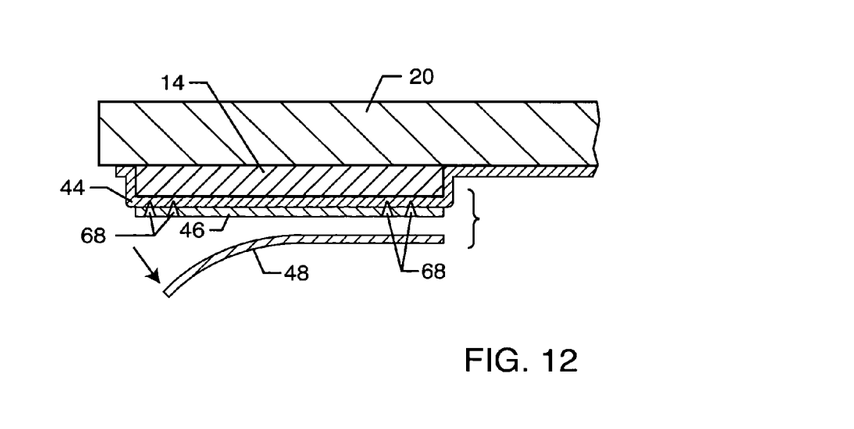
FIG. 12 is an enlarged fragmented and partially exploded perspective view taken generally on the line 12-12 of FIG. 11.

The above-described physical deformation of one or both of the capacitor plates 14, 16 upon attempted separation of the interconnected head and tail ends 20, 22 of the identification band 10 may be enhanced by pre-forming an array of small cuts or slits 68 in one or both of the head and tail ends. More particularly, as viewed in FIGS. 11-12, an array of relatively small and relatively shallow pre-cut slits 68 may be formed to extend through the adhesive layer 46 and partially through the layer 44 of protective film overlying the capacitor plate 14 at the head end 20 of the identification band 10. These pre-cut slits 68 may be shaped as shown to define one or more pre-shaped tabs 70, the peripheries of which provide rupture sites for relatively easy and substantial deformation and tearing of the associated capacitor plate 14 upon attempted forced separation of the band head and tail ends 20, 22, thereby substantially assuring detuning of the communication circuit, as previously described.

Figure 13:
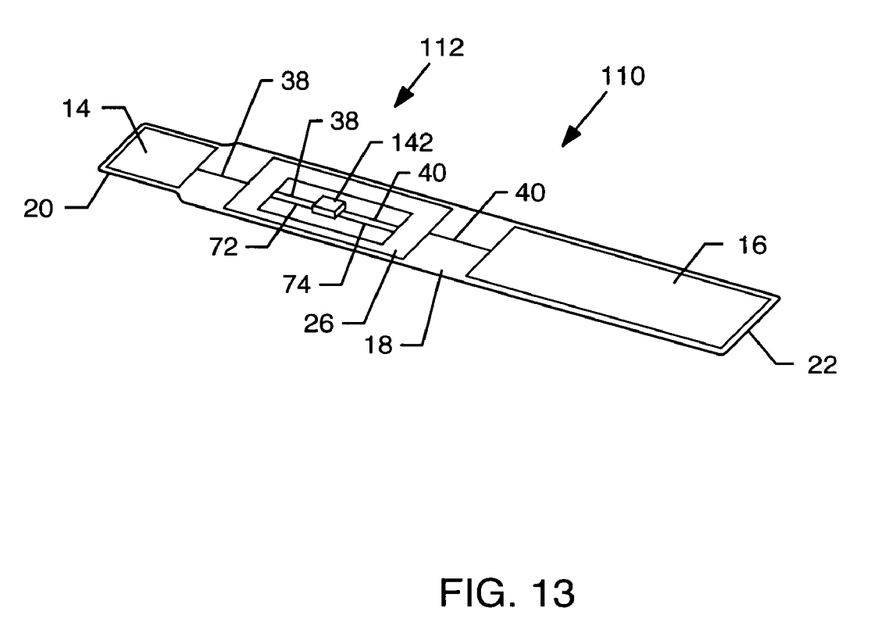
FIG. 13 is a perspective view depicting an alternative preferred form of the invention.
Figure 14:
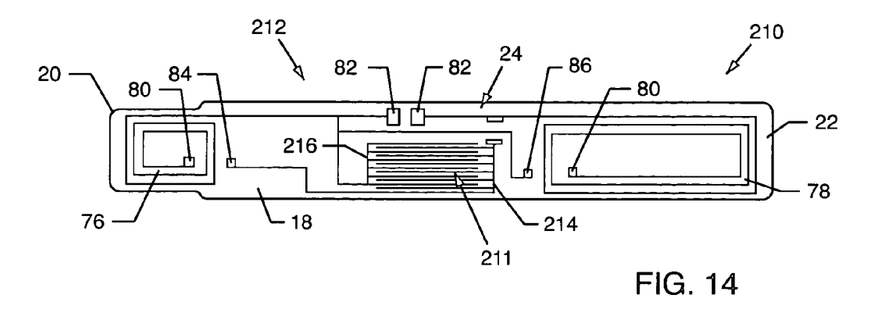
FIG. 14 is a plan view showing another alternative preferred form of the invention, depicting an elongated flexible strap incorporating adhesively attachable coupling elements in the form of a pair of inductor coils formed thereon as by printing at opposite head and tail ends of the band.

FIG. 13 depicts another alternative preferred form of the invention, wherein a modified identification band 110 includes the capacitor plates 14, 16 formed respectively at the head and tails ends 20, 22 of a length of the strap material 18, but further including a modified communication circuit 112 incorporating an RFID chip 142 or the like adapted for connection to a pair of conductive input sets. As shown in a partially constructed state in FIG. 13, the RFID chip 142 is respectively connected via conductive traces 38 and 40 with the pair of capacitor plates 14, 16, and also connected via additional conductive traces 72, 74 with a surrounding coil element 26. This partially constructed identification band 110 is then completed as previously described to include the adhesive layer (not shown in FIG. 13) for adhesively interconnecting the head and tail ends 20, 22, as the band 110 is secured onto a wearer's wrist or the like. The additional pre-cut slits 68 and associated tabs 70 as viewed in FIGS. 11-12 may also be provided. In this configuration, the RFID circuit or chip 142 may be programmed to recognize the altered capacitance attributable to forced deformation of distortion of one or both capacitor plates 14, 16, and to signal a remote reader regarding such capacitance change. Accordingly, attempted tampering with the band 10 may be detected and indicated to provide enhanced security. That is, the RFID circuit may permit continued communication with a remote reader, but includes means for recognizing that a tamper-indicative change in circuit capacitance has taken place and communicates such fact to the remote reader upon subsequent communication therewith.

FIGS. 14-17 and 18-21 illustrate two alternative preferred embodiments of the invention constructed generally in accordance with the methodology described above with respect to the embodiments of FIGS. 1-13, but wherein the electronic coupling elements carried respectively at the head and tail ends 20, 22 of the identification band are provided in the form of a pair of inductive coils 76 and 78. In each of these additional embodiments, the coils 76, 78 are coupled into a communication circuit 212 including an RFID chip or circuit 42 (FIGS. 17 and 21), and a capacitor 211 formed or mounted on the central region 24 of the band strap material 18.

More particularly, with reference to the embodiment of FIGS. 14-17, a length of the band-forming strap material 18 may be printed with the coils 76 and 78 formed on a common side of the band material, but located generally at the opposite head and tail ends 20, 22. Each of the these two coils 76, 78 includes opposite coil ends defining a pair of conductive contact terminal points 80 and 82, respectively. In this regard, the contact point 80 of each inductive coil is disposed within the coil interior, whereas the contact points 82 of the two coils are positioned in adjoining spaced-apart array on the central region 24 of the strap material. The capacitor is also formed on the strap central region 24 and is shown in FIGS. 14-17 in the form of an interleaved array of conductive capacitor traces 214 and 216. The capacitor traces 214 are connected to a conductive contact terminal point 84 in closed-spaced proximity to the head-end inductor coil 76, whereas the capacitor traces 216 are connected to a conductive contact terminal point 86 in closed-spaced proximity to the tail-end inductor coil 78.

Figure 15:
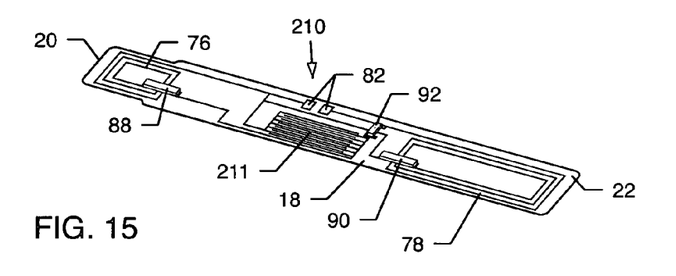
Figure 16:
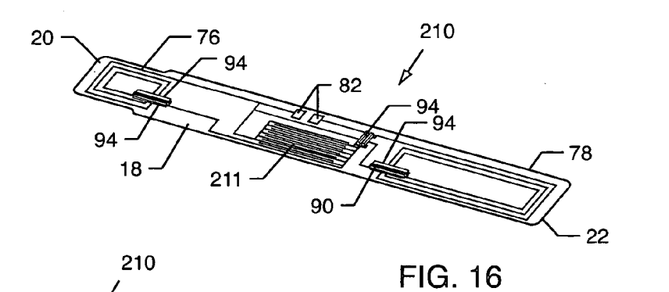
Figure 17:
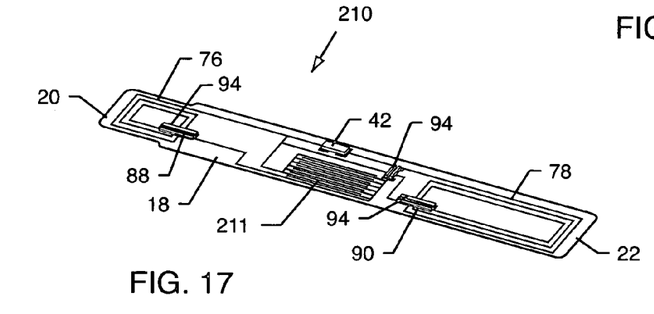
Figure 18:
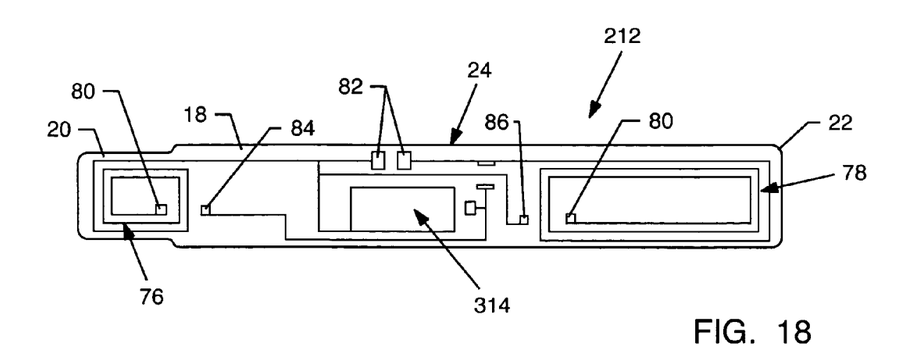
FIG. 18 a plan view showing one alternative preferred form of the inductively coupled identification band depicted in FIGS. 14-17.

FIG. 15 illustrates a subsequent process step wherein nonconductive bridge layers 88 and 90 are provided as by printing to extend or bridge between the contact points 80, 84 associated with the head-end coil 76, and to extend or bridge between the contact points 80, 86 associated with the tail-end coil 78. An additional bridge layer 92 is shown bridging conductive traces associated with the contact point 86 and the outer contact point 82 of the tail-end coil 78. FIG. 16 shows the application as by printing of conductive traces 94 extending over each of these bridge layers 88, 90 and 92 for electrically connecting the associated portions of the communication circuit 212, and FIG. 17 illustrates mounting of the associated RFID chip 42 thereon. The thus-partially constructed identification band 210 (FIGS. 14-17) may be completed as previously described, to include the adhesive layer 46 for adhesively securing the head and tails ends 20, 22 in overlying relation as the band is mounted onto a user's wrist or the like.

Figure 19:
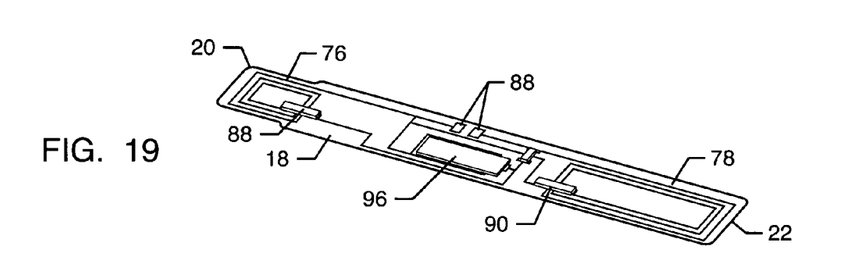
Figure 20:
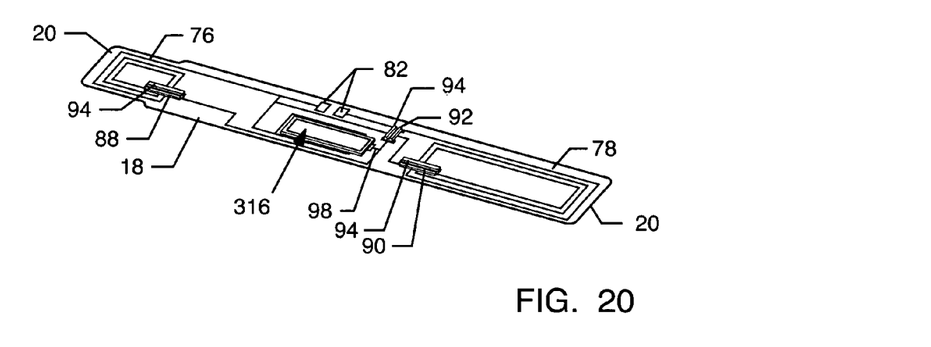
Figure 21:
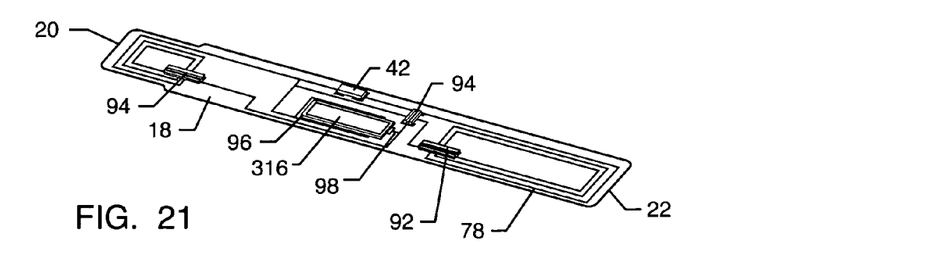

FIGS. 18-21 depict a modified version of the inductively coupled identification band of FIGS. 14-17, wherein a capacitor is formed on the central region 24 of the strap material 18 by successive print steps or the like to form a pair of overlying or stacked capacitor plates 314 and 316. That is, a first capacitor plate 314 may be printed onto the substrate strap material 18 (FIG. 18) and thereafter covered with a dielectric layer 96 of selected thickness (FIG. 19). In a subsequent printing step or the like (FIG. 20), the second capacitor plate 316 may be printed on top of the dielectric layer 96, and appropriately coupled to other components of the communication circuit 212 by a conductive trace 98. Thereafter, the RFID chip or circuit may be installed (FIG. 21), followed by completion of the identification band as previously described.

In use, upon mounting of the identification band (FIGS. 14-21) about a wearer's wrist or the like, the pair of coils 76, 78 are inductively coupled for appropriately activating or enabling the associated communication circuit 212. Upon attempted separation of the adhesively secured head and tail ends 20, 22, one or both of the overlying inductive coils 76, 78 (FIGS. 14-21) is sufficiently distorted and/or deformed and destroyed as by tearing to detune the communication circuit and thereby prevent subsequent wireless communication with a remote reader.

The improved identification band of the present invention thus provides for electronic monitoring and detection of attempted tampering and/or attempted unauthorized use or re-use, without requiring visual inspection of each identification band at the time of communication with the remote reader. Instead, attempted tampering is accompanied by changes in the RFID communication circuit, wherein such changes are electronically indicated by preventing subsequent communication with a remote reader, or alternately by transmitting an appropriate signal to the reader which may then signal appropriate security personnel.

A variety of further modifications and improvements in and to the improved identification band of the present invention will be apparent to persons skilled in the art. As one example, persons skilled in the art will recognize and appreciate that the RFID circuitry can be mounted onto the identification band in the form of a solid state chip, or alternately formed thereon as by means of thin film printing processes or the like. As one further example, persons skilled in the art will also recognize and understand that the embodiment depicted in FIG. 13 with the RFID chip or circuit 142 coupled to a pair of conductive sets may be modified so that the band head and tail ends include mutually coupled inductor coils 76, 78 as shown and described in FIGS. 14-21, in lieu of the mutually coupled capacitor plates 14, 16 as shown. Accordingly, no limitation on the invention is intended by way of the foregoing description and accompanying drawings, except as set forth in the appended claims.

What is claimed is:

1. An identification band, comprising:
    an elongated flexible strap having a head end and a tail end;
    a communication circuit carried by said strap, said communication circuit including a pair of electronic coupling elements disposed generally at said strap head and tail ends;
    wherein one of said coupling elements has a predetermined area, and wherein the other of said coupling elements has a length greater than the length of said one coupling element;
    an adhesive for securing said strap head and tails ends in overlapping relation with said pair of electronic coupling elements in mutually coupled relation, to configure said strap into a closed loop shape of selected circumferential size; and
    at least one of said electronic coupling elements being physically altered in response to attempted forced separation of said adhesively secured strap head and tail ends to correspondingly alter at least one characteristic of said communication circuit.

2. The identification band of claim 1 wherein said flexible strap comprises a wristband.

3. The identification band of claim 1 wherein said pair of electronic coupling elements in mutually coupled relation enables said communication circuit.

4. The identification band of claim 1 wherein said flexible strap is formed from a dielectric material.

5. The identification band of claim 1 wherein said communication circuit is formed on one side of said flexible strap.

6. The identification band of claim 1 wherein said adhesive comprises a pressure sensitive adhesive.

7. The identification band of claim 1 further including a protective film mounted over at least a portion of said communication circuit on one side of said flexible strap.

8. The identification band of claim 1 wherein said communication circuit comprises a radio frequency identification (RFID) circuit adapted for wireless communication with a remote reader.

9. The identification band of claim 1 wherein said pair of electronic coupling elements comprises a pair of capacitor plates.

10. The identification band of claim 9 wherein said one of said capacitor plates has a width no greater than the width of said other of said capacitor plates.

11. The identification band of claim 9 further including a dielectric material interposed between said capacitor plates upon adhesive securement of said strap head and tail ends in overlapping relation.

12. The identification band of claim 11 wherein said dielectric material comprises said strap tail end.

13. The identification band of claim 9 wherein said capacitor plates cooperatively define a capacitor component of said communication circuit and, when mutually coupled upon adhesive securement of said strap head and tail ends in overlapping relation, enable said communication circuit with a predetermined resonance frequency for tuned communication with a remote reader, and further wherein said physical alteration of at least one of said capacitor plates upon attempted forced separation of said adhesively secured strap head and tail ends correspondingly alters the resonance frequency of said communication circuit.

14. The identification band of claim 9, wherein said pair of capacitor plates are electrically connected by conductive traces carried by said strap.

15. The identification band of claim 14, wherein the conductive traces are frangible and easily broken.

16. The identification band of claim 14, wherein the combination of capacitor plates and conductive traces creates the communication circuit carried by the strap that is enabled by coupling of the capacitor plates.

17. The identification band of claim 16, wherein the communication circuit is carried along an internal perimeter of the strap.

18. The identification band of claim 16, wherein damage to the capacitor plates and/or conductive traces may interrupt or break the communication circuit.

19. The identification band of claim 18, wherein the communication circuit is disabled or altered if interrupted or broken.

20. The identification band of claim 1 wherein said pair of electronic coupling elements comprises a pair of inductor coils.

21. The identification band of claim 1 wherein said electronic coupling elements, when mutually coupled upon adhesive securement of said strap head and tail ends in overlapping relation, enable said communication circuit with a predetermined resonance frequency for tuned communication with a remote reader, and further wherein said physical alteration of at least one of said coupling elements upon attempted forced separation of said adhesively secured strap head and tail ends correspondingly alters the resonance frequency of said communication circuit.

22. The identification band of claim 1 wherein said communication circuit includes means for recognizing that a change in said at least one circuit characteristic has taken place, and for transmitting that fact to a remote reader upon subsequent communication therewith.

23. The identification band of claim 22, wherein the communication circuit includes an electronic alarm configured to activate in the event at least one characteristic of the communication circuit is altered.

24. The identification band of claim 1 wherein at least one of said strap head and tails ends has at least one pre-cut slit formed therein.

25. An identification band, comprising:
an elongated flexible strap formed from a dielectric material and having a head end and a tail end;
a communication circuit carried by said strap, said communication circuit including a pair of electronic coupling elements disposed on one side of said strap generally at said head and tail ends thereof;
wherein one of said coupling elements has a predetermined area, and wherein the other of said coupling elements has a length greater than the length of said one coupling element;
an adhesive layer overlying one of said electronic coupling elements, said adhesive layer being for securing said strap head and tail ends in overlapping relation with said pair of electronic coupling elements in mutually coupled relation, to configure said strap into a closed loop shape of selected circumferential size; and
at least one of said electronic coupling elements being physically altered in response to attempted forced separation of said adhesively secured strap head and tail ends to correspondingly alter at least one characteristic of said communication circuit.

26. The identification band of claim 25 wherein said pair of electronic coupling elements in mutually coupled relation enables said communication circuit.

27. The identification band of claim 25 wherein said communication circuit is formed on said one side of said flexible strap.

28. The identification band of claim 27 further including a protective film mounted over at least a portion of said communication circuit on said one side of said flexible strap.

29. The identification band of claim 25 wherein said adhesive layer comprises a pressure sensitive adhesive patch, and further including a peel-off strip protectively covering said patch.

30. The identification band of claim 25 wherein said communication circuit comprises a radio frequency identification (RFID) circuit adapted for wireless communication with a remote reader.

31. The identification band of claim 25 wherein said electronic coupling elements comprise conductive films printed onto said flexible strap.

32. The identification band of claim 25 wherein said pair of electronic coupling elements comprises a pair of capacitor plates.

33. The identification band of claim 32 wherein said one of said capacitor plates has a width no greater than the width of said other of said capacitor plates.

34. The identification band of claim 32 wherein said capacitor plates cooperatively define a capacitor component of said communication circuit and, when mutually coupled upon adhesive securement of said strap head and tail ends in overlapping relation, enable said communication circuit with a predetermined resonance frequency for tuned communication with a remote reader, and further wherein said physical alteration of at least one of said capacitor plates upon attempted forced separation of said adhesively secured strap head and tail ends correspondingly alters the resonance frequency of said communication circuit.

35. The identification band of claim 25 wherein said pair of electronic coupling elements comprises a pair of inductor coils.

36. The identification band of claim 25 wherein said electronic coupling elements, when mutually coupled upon adhesive securement of said strap head and tail ends in overlapping relation, enable said communication circuit with a predetermined resonance frequency for tuned communication with a remote reader, and further wherein said physical alteration of at least one of said coupling elements upon attempted forced separation of said adhesively secured strap head and tail ends correspondingly alters the resonance frequency of said communication circuit.

37. The identification band of claim 25 wherein said adhesive layer has at least one pre-cut slit formed therein.

38. The identification band of claim 25 wherein at least one of said strap head and tails ends has at least one pre-cut slit formed therein.

39. The identification band of claim 25 wherein said communication circuit includes means for recognizing that a change in said at least one circuit characteristic has taken place, and for transmitting that fact to a remote reader upon subsequent communication therewith.

40. The identification band of claim 39, wherein the communication circuit includes an electronic alarm configured to activate in the event at least one characteristic of the communication circuit is altered.

41. A method of making an identification band, said method comprising the steps of:
mounting a communication circuit onto an elongated flexible strap, wherein the communication circuit includes a pair of electronic coupling elements respectively positioned generally at head and tail ends of the strap;
forming one of the coupling elements with a predetermined area, and forming the other of the coupling elements with a length greater than the length of said one coupling element;
wrapping the band into a closed loop shaped extending about a portion of a selected person or object, with the strap head and tail ends in overlapping relation; and
adhesively interconnecting said head and tail ends in overlapping relation with the pair of electronic coupling elements in mutually coupled relation to enable the communication circuit, wherein attempted forced separation of the adhesively secured strap head and tail ends physically alters at least one of the electronic coupling elements.

42. The method of claim 41 including forming the flexible strap from a dielectric material.

43. The method of claim 42 including forming the communication circuit on one side of the flexible strap.

44. The method of claim 42 wherein said adhesively connecting step uses a pressure sensitive adhesive.

45. The method of claim 44 further including the step of applying a layer of the pressure sensitive adhesive overlying one of the pair of electronic coupling elements.

46. The method of claim 45 further including the step of forming at least one pre-cut slit in said layer of pressure sensitive adhesive.

47. The method of claim 45 further including the step of forming at least one pre-cut slit in at least one of the strap head and tail ends.

48. The method of claim 42 further including the step of applying a protective film over at least a portion of the communication circuit.

49. The method of claim 41 wherein the pair of electronic coupling elements comprises a pair of capacitor plates.

50. The method of claim 49 further including forming said one of said capacitor plates to have a width no greater than the width of said other of said capacitor plates.

51. The method of claim 49 further including steps forming the flexible strap from a dielectric material, and forming the capacitor plates on a common side of the flexible strap.

52. The method of claim 41 wherein the pair of electronic coupling elements comprises a pair of inductive coils.

53. An identification band, comprising:
an elongated flexible strap having a head end and a tail end;
a communication circuit carried by said strap, said communication circuit including a pair of electronic coupling elements disposed generally at said strap head and tail ends;
wherein one of said coupling elements has a predetermined area correlated with a predetermined capacitance and resonance frequency of the communication circuit, and wherein the other of said coupling elements has a length greater than the length of said one coupling element so as to span the entire length thereof;
an adhesive for securing said strap head and tails ends in overlapping relation with said pair of electronic coupling elements in mutually coupled relation, to configure said strap into a closed loop shape of selected circumferential size; and
at least one of said electronic coupling elements being physically altered in response to attempted forced separation of said adhesively secured strap head and tail ends to correspondingly alter either the capacitance or resonance frequency.

54. The identification band of claim 53 wherein said flexible strap comprises a wristband.

55. The identification band of claim 53 wherein said pair of electronic coupling elements in mutually coupled relation enables said communication circuit.

56. The identification band of claim 53 wherein said flexible strap is formed from a dielectric material.

57. The identification band of claim 53 wherein said communication circuit is formed on one side of said flexible strap.

58. The identification band of claim 53 wherein said adhesive comprises a pressure sensitive adhesive.

59. The identification band of claim 53 further including a protective film mounted over at least a portion of said communication circuit on one side of said flexible strap.

60. The identification band of claim 59 wherein said strap head and tail ends further comprise an array of relatively small and relatively shallow pre-cut slits through said adhesive and said protective film to provide rupture sites for relatively easy and substantial deformation of the associated electronic coupling element upon attempted forced separation thereof.

61. The identification band of claim 53 wherein said communication circuit comprises a radio frequency identification (RFID) circuit adapted for wireless communication with a remote reader.

62. The identification band of claim 53 wherein said pair of electronic coupling elements comprises a pair of capacitor plates.

63. The identification band of claim 62 wherein said one of said capacitor plates has a width no greater than the width of said other of said capacitor plates.

64. The identification band of claim 62 further including a dielectric material interposed between said capacitor plates upon adhesive securement of said strap head and tail ends in overlapping relation.

65. The identification band of claim 64 wherein said dielectric material comprises said strap tail end.

66. The identification band of claim 62 wherein said capacitor plates cooperatively define a capacitor component of said communication circuit and, when mutually coupled upon adhesive securement of said strap head and tail ends in overlapping relation, enable said communication circuit with a predetermined resonance frequency for tuned communication with a remote reader, and further wherein said physical alteration of at least one of said capacitor plates upon attempted forced separation of said adhesively secured strap head and tail ends correspondingly alters the resonance frequency of said communication circuit.

67. The identification band of claim 53 wherein said pair of electronic coupling elements comprises a pair of inductor coils.

68. The identification band of claim 53 wherein said electronic coupling elements, when mutually coupled upon adhesive securement of said strap head and tail ends in overlapping relation, enable said communication circuit with a predetermined resonance frequency for tuned communication with a remote reader, and further wherein said physical alteration of at least one of said coupling elements upon attempted forced separation of said adhesively secured strap head and tail ends correspondingly alters the resonance frequency of said communication circuit.

69. The identification band of claim 53 wherein said communication circuit includes means for recognizing that a change in said at least one circuit characteristic has taken place, and for transmitting that fact to a remote reader upon subsequent communication herewith.

70. The identificatiom band of claim 53 wherein at least one of said strap head and tails ends has at least one pre-cut formed therein.

71. The identificatiom band of claim 53 wherein said strap head and tail ends include an array of samll cuts or slits to enhance the physical alteration of said at least one coupling element in response to attempted forced separation thereof.

* * * * *

UNITED STATES PATENT AND TRADEMARK OFFICE
CERTIFICATE OF CORRECTION

| | |
|---|---|
| PATENT NO. | : 7,316,358 B2 |
| APPLICATION NO. | : 10/712935 |
| DATED | : January 8, 2008 |
| INVENTOR(S) | : Mark M. Kotik and Walter W. Mosher, Jr. |

It is certified that error appears in the above-identified patent and that said Letters Patent is hereby corrected as shown below:

Column 16, line 19, insert --slit-- before "formed".

Signed and Sealed this

Third Day of June, 2008

JON W. DUDAS
*Director of the United States Patent and Trademark Office*